US012683336B2

(12) United States Patent
Qiu et al.

(10) Patent No.: US 12,683,336 B2
(45) Date of Patent: Jul. 14, 2026

(54) FUSE CONNECTOR

(71) Applicant: Astec International Limited, Kowloon (HK)

(72) Inventors: Jinyu Qiu, Shenzhen City (CN); Zhihong Li, Zhongshan City (CN); Fang Fang Xu, Shenzhen City (CN)

(73) Assignee: AES Global Holdings PTE. Ltd., Singapore (SG)

( * ) Notice: Subject to any disclaimer, the term of this patent is extended or adjusted under 35 U.S.C. 154(b) by 0 days.

(21) Appl. No.: 18/578,790

(22) PCT Filed: Oct. 10, 2022

(86) PCT No.: PCT/CN2022/124297
§ 371 (c)(1),
(2) Date: Jan. 12, 2024

(87) PCT Pub. No.: WO2024/077432
PCT Pub. Date: Apr. 18, 2024

(65) Prior Publication Data
US 2025/0239820 A1 Jul. 24, 2025

(51) Int. Cl.
*H01R 13/688* (2011.01)

(52) U.S. Cl.
CPC .................................. *H01R 13/688* (2013.01)

(58) Field of Classification Search
CPC .. H01R 13/684; H01R 13/688; H01R 85/205; H01R 2085/2065
See application file for complete search history.

(56) References Cited

U.S. PATENT DOCUMENTS

| | | | | |
|---|---|---|---|---|
| 4,488,767 A * | 12/1984 | Lehman | H01H 85/547 337/213 |
| 10,249,465 B2 * | 4/2019 | Brakefield | H01H 89/04 |
| 10,283,309 B2 * | 5/2019 | Craig | H01H 9/10 |
| 2010/0124834 A1 * | 5/2010 | De Chazal | H01H 9/104 439/271 |

FOREIGN PATENT DOCUMENTS

| | | |
|---|---|---|
| CN | 210897888 U | 6/2020 |
| CN | 214280353 U | 9/2021 |
| CN | 113644469 A | 11/2021 |
| EP | 3410453 A1 | 12/2018 |

OTHER PUBLICATIONS

International Search Report & Written Opinion for PCT Application No. PCT/CN2022/124297, mailed Mar. 27, 2023; 14 pages.

* cited by examiner

*Primary Examiner* — Ross N Gushi

(57) ABSTRACT

A socket assembly for a fuse connector comprises a first bus bar, a fuse bus bar, and a fuse holder. The first bus bar comprises a contact blade extending toward a proximal end of the socket assembly and a fuse contact assembly. The fuse bus bar comprises a first fuse contact assembly and a distal end positioned adjacently to a distal end of the socket assembly. The fuse holder is removably engaged with the socket assembly and comprises an end wall at a distal end of the fuse holder. The end wall is configured to pass through the fuse contact assembly of the first bus bar and through the first fuse contact assembly of the fuse bus bar when removed from or inserted into the socket assembly.

20 Claims, 8 Drawing Sheets

FUSE CONNECTOR

TECHNICAL FIELD

Aspects of this disclosure relate to output power distribution, and more particularly to current protection via a fuse.

BACKGROUND

In electronic systems requiring power conversion and distribution from a power supply to a load, a power distribution unit (PDU) positioned between the power supply and the load can be used to control the power distribution from the power supply to the load. Based on the power needs of the load such as a telecommunication device, for example, the PDU is configurable to deliver a maximum current to the load based on the load requirements. The maximum current suppliable by the PDU is configurable depending on the load. Thus, the PDU may be used in a variety of power delivery/distribution contexts. The PDU, however, can add extra bulk and cost to a power system.

SUMMARY

In accordance with one aspect of the present disclosure, a socket assembly for a fuse connector comprises a first bus bar, a fuse bus bar, and a fuse holder. The first bus bar comprises a contact blade extending toward a proximal end of the socket assembly and a fuse contact assembly. The fuse bus bar comprises a first fuse contact assembly and a distal end positioned adjacently to a distal end of the socket assembly. The fuse holder is removably engaged with the socket assembly and comprises an end wall at a distal end of the fuse holder. The end wall is configured to pass through the fuse contact assembly of the first bus bar and through the first fuse contact assembly of the fuse bus bar when removed from or inserted into the socket assembly.

In accordance with another aspect of the present disclosure, a fuse connector assembly comprises a socket body having an interior volume and comprises a socket assembly positioned within the interior volume of the socket body. The socket assembly comprises a first bus bar, a second bus bar, a fuse bus bar, and a fuse holder. The first bus bar comprises a contact blade extending toward a proximal end of the socket body and a fuse contact assembly. The second bus bar comprises a contact blade extending toward the proximal end of the socket body. The fuse bus bar comprises a first fuse contact assembly. The fuse holder is removable from the socket body and comprises an end wall configured to pass through the fuse contact assembly and the first fuse contact assembly during removal from and insertion into the socket body. The plug body has an interior volume and comprises a wire body positioned within the interior volume of the plug body. The wire body comprises a first conductive wire contact configured to mechanically and electrically couple with the first bus bar and a second conductive wire contact configured to mechanically and electrically couple with the second bus bar.

BRIEF DESCRIPTION OF THE DRAWINGS

The drawings illustrate embodiments presently contemplated for carrying out the invention.

In the drawings.

Figure 1:
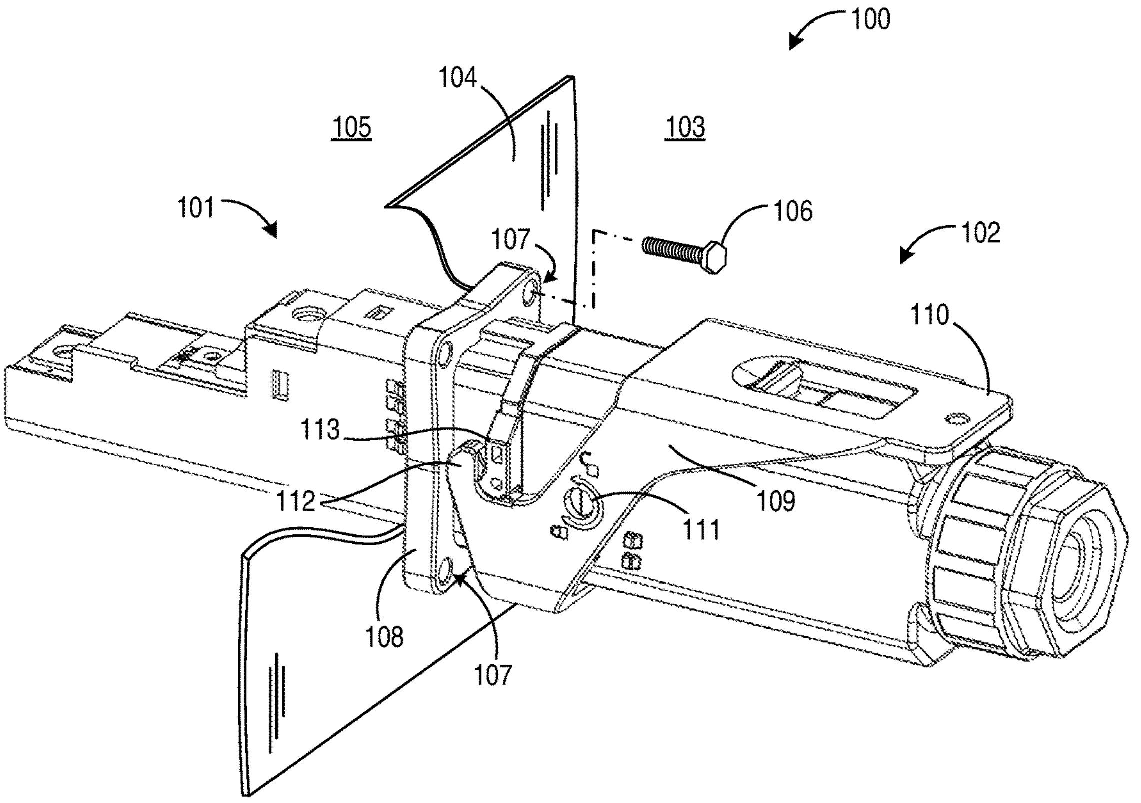
FIG. 1 is an orthogonal view of a fuse connector according to an embodiment.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 2:
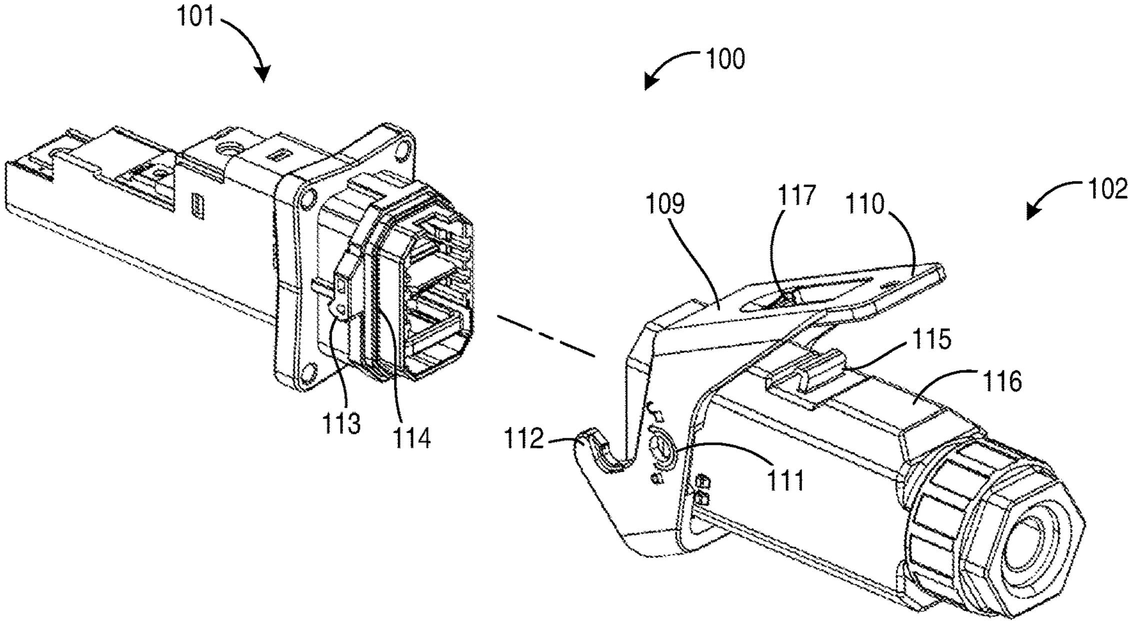
FIG. 2 is an orthogonal view illustrating separation of the socket body from the plug body of the fuse holder of FIG. 1 according to an embodiment.

FIGS. 1 and 2 illustrate orthogonal views of a fuse connector 100 according to embodiments of this disclosure. The fuse connector 100 includes a socket body 101 and a plug body 102 configured to mate with the socket body 101 to provide an electrical connection from a first side 103 (e.g., an exterior environment) of a wall 104 such as a chassis wall to a second side 105 (e.g., an interior environment) of the wall 104. A cutaway portion of the wall 104 is illustrated in FIG. 1 to allow visualization of an interior portion of the socket body 101. Fasteners 106 such as a bolt or screw may be used to fasten the socket body 101 to the wall 104 via fastener apertures 107 formed in a flange portion 108 of the socket body 101.

While FIG. 1 illustrates an engagement or coupling of the socket body 101 and the plug body 102 in a plugged arrangement, FIG. 2 illustrates the disengagement or separation of the bodies 101, 102 in an unplugged arrangement. The plug body 102 includes a rotatable latch assembly 109 including a handle 110, a pivot portion 111, and locking arms 112. The locking arm 112 rotate in a counterclockwise movement from the point of view illustrated in FIG. 2 in response to the latch assembly 109 being rotated into a disengaged position to disengage themselves from locking tabs 113 formed on the socket body 101. To allow for coupling of the bodies 101, 102, the latch assembly 109 is positioned as illustrated in FIG. 2, and the plug body 102 is brought into engagement with the socket body 101, which slides into the plug body 102. The socket body 101 may operate in one embodiment as a male part while the plug body 102 may operate as a female part. After the locking arms 112 are moved past the locking tabs 113 while the socket body 101 is inserted into the plug body 102, the latch assembly 109 may be rotated in the locking direction (e.g., in a clockwise direction) to a locking position to raise the locking arms 112 up into mechanical engagement with the locking tab 113. This movement may also cause the plug body 102 to move into a tighter engagement with the plug body 102 along the insertion direction. A flexible ring or washer 114 attached to the male end of the socket body 101 assists to restrict contaminants such as dirt or water from passing between the male and female portions of the bodies 101, 102 toward an interior of the fuse connector 100. A securing tab 115 extending from a top surface of a plug housing 116 is positioned to engage a securing recess 117 formed in the handle 110. In this manner, the handle 110 may be held in the locking position to avoid unplanned or spontaneous disengagement of the bodies 101, 102.

Figure 3:
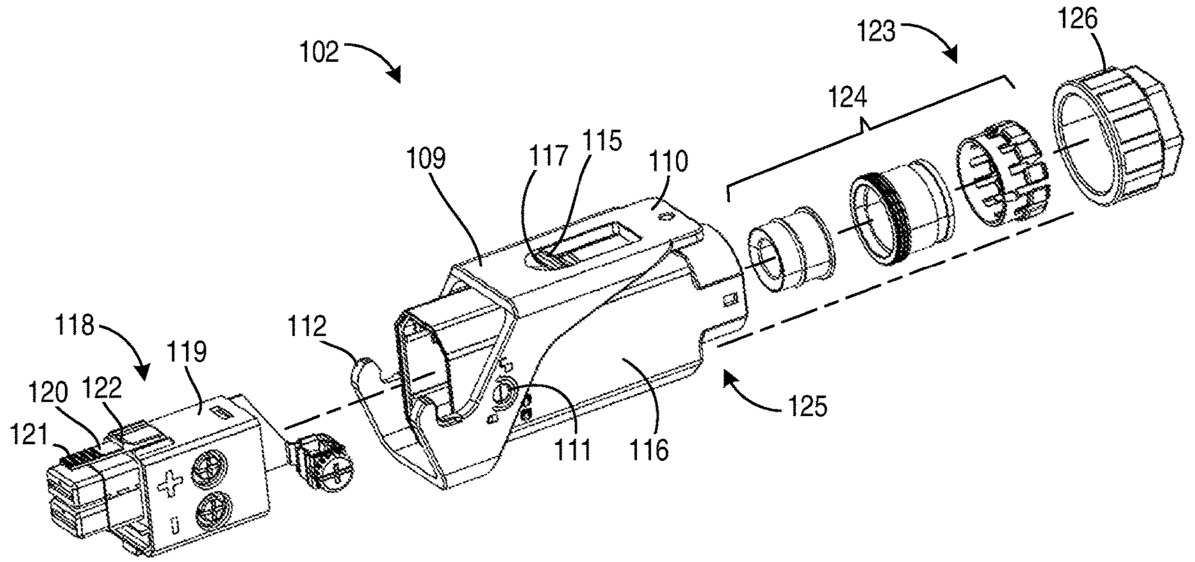
FIG. 3 is a partial exploded view of the plug body of the fuse holder of FIG. 1 according to an embodiment.

FIG. 3 illustrates a partial exploded view of the plug body 102 of the fuse connector 100 of FIG. 1 according to an embodiment. A wire body 118 is shown exploded out of a front end of the plug body 102. The wire body 118 includes a wire housing 119 including a securing tab 120 positioned on a top surface of the wire housing 119 for securing the wire body 118 inside the plug body 102. Depression of a cantilevered tongue 121 of the securing tab 120 moves a tab member 122 out of engagement with the plug housing 116 to allow removal of the wire body 118.

A wire guide 123 includes an internal assembly 124 configured to be inserted into a wire insertion end 125 of the plug housing 116 and includes an end cap 126 configured to be secured to the internal assembly 124. A multi-phase wire (not shown) including, for example, three wire strands for coupling with the wire body 118 is inserted through the internal assembly 124 and the interior of the plug housing 116. Each of the three wire strands may be coupled with a respective wire contact (FIGS. 4 and 6) for coupling with the socket body 101 during engagement of the plug body 102 with the socket body 101.

Figure 4:
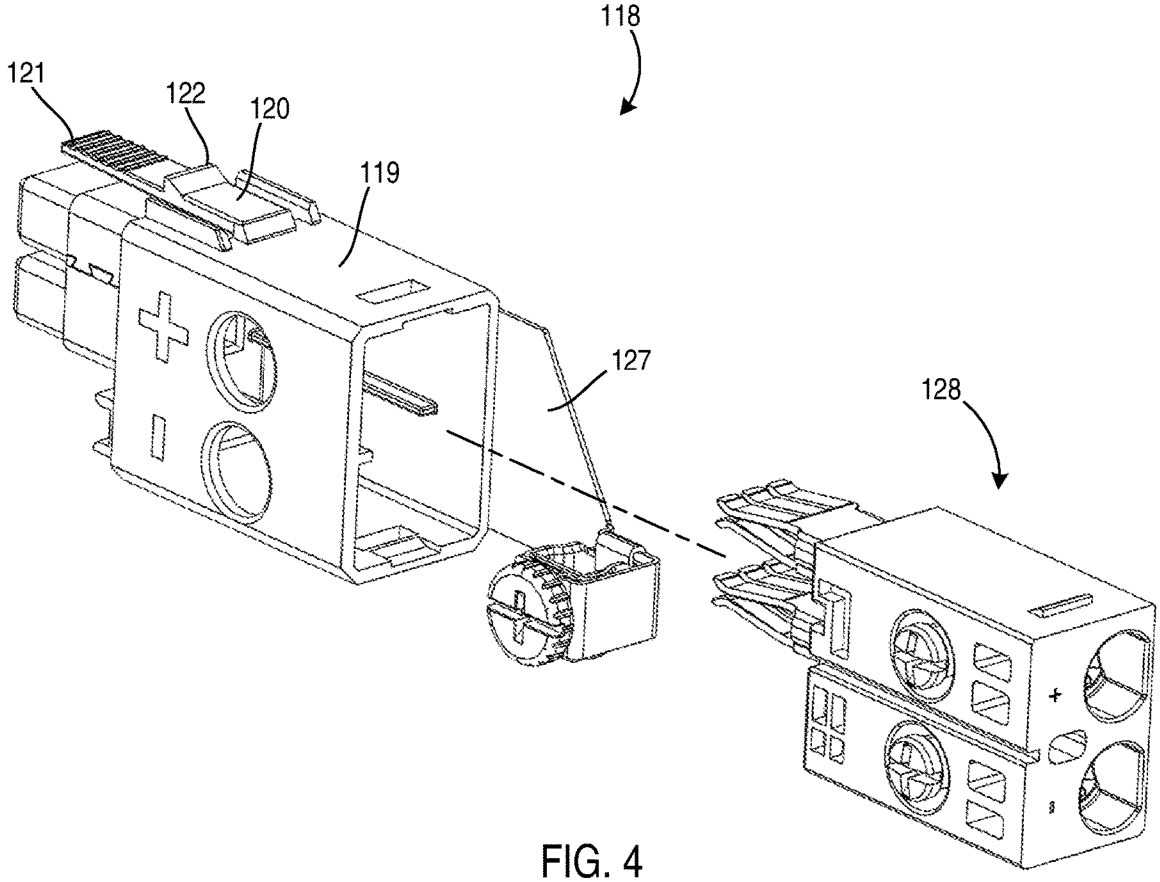
FIGS. 4-5 are partial exploded views of the wire body of the fuse holder of FIG. 1 according to an embodiment.
Figure 5:
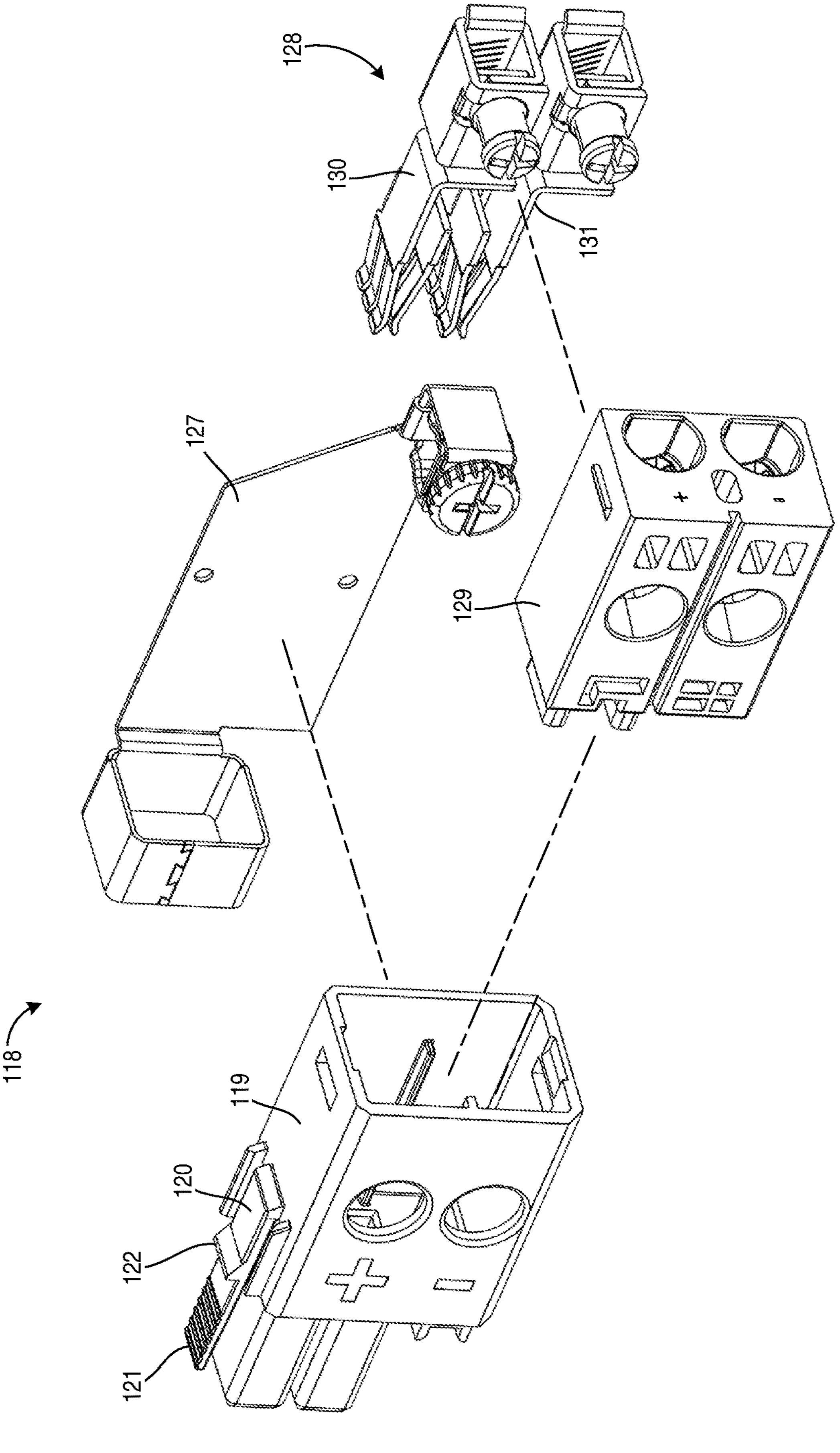

FIGS. 4 and 5 illustrate partial exploded views of the wire body 118 of the fuse holder 100 of FIG. 1 according to embodiments. In FIG. 4, the wire housing 119 and a chassis wire contact 127 are illustrated as being exploded from a plug wire contact assembly 128 positioned internally of the wire housing 119. As illustrated in FIG. 5, the chassis wire contact 127 is shown further exploded from the wire housing 119, and the components of the plug wire contact assembly 128 are shown exploded from each other and include a plug wire contact housing 129 and a pair of conductive wire contacts 130, 131.

Figure 6:
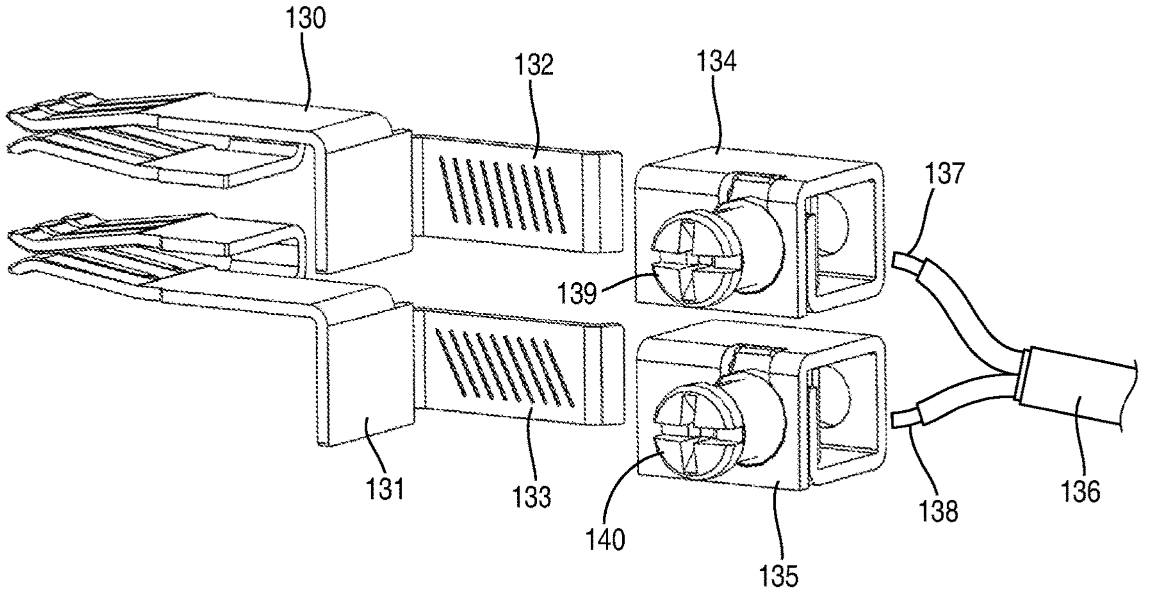
FIG. 6 is a partial exploded view of a pair of the conductive wire contacts of the wire body of FIG. 4 according to an embodiment.

FIG. 6 illustrates a partial exploded view of a pair of the conductive wire contacts 130, 131 of the plug wire contact assembly 128 of FIGS. 4, 5 according to an embodiment. The conductive wire contacts 130, 131 include respective wire engagement surfaces 132, 133 inserted into respective screw assemblies 134, 135. A multi-strand wire 136 includes a pair of wire strands 137, 138 for insertion between screws 139, 140 of the screw assemblies 134, 135 and the wire engagement surfaces 132, 133. The wire strands 137, 138 may be solid core wires or may be stranded wires. When tightened, the screws 139, 140 enforce electrical coupling between the wire strands 137, 138 and the wire engagement surfaces 132, 133.

Figure 7:
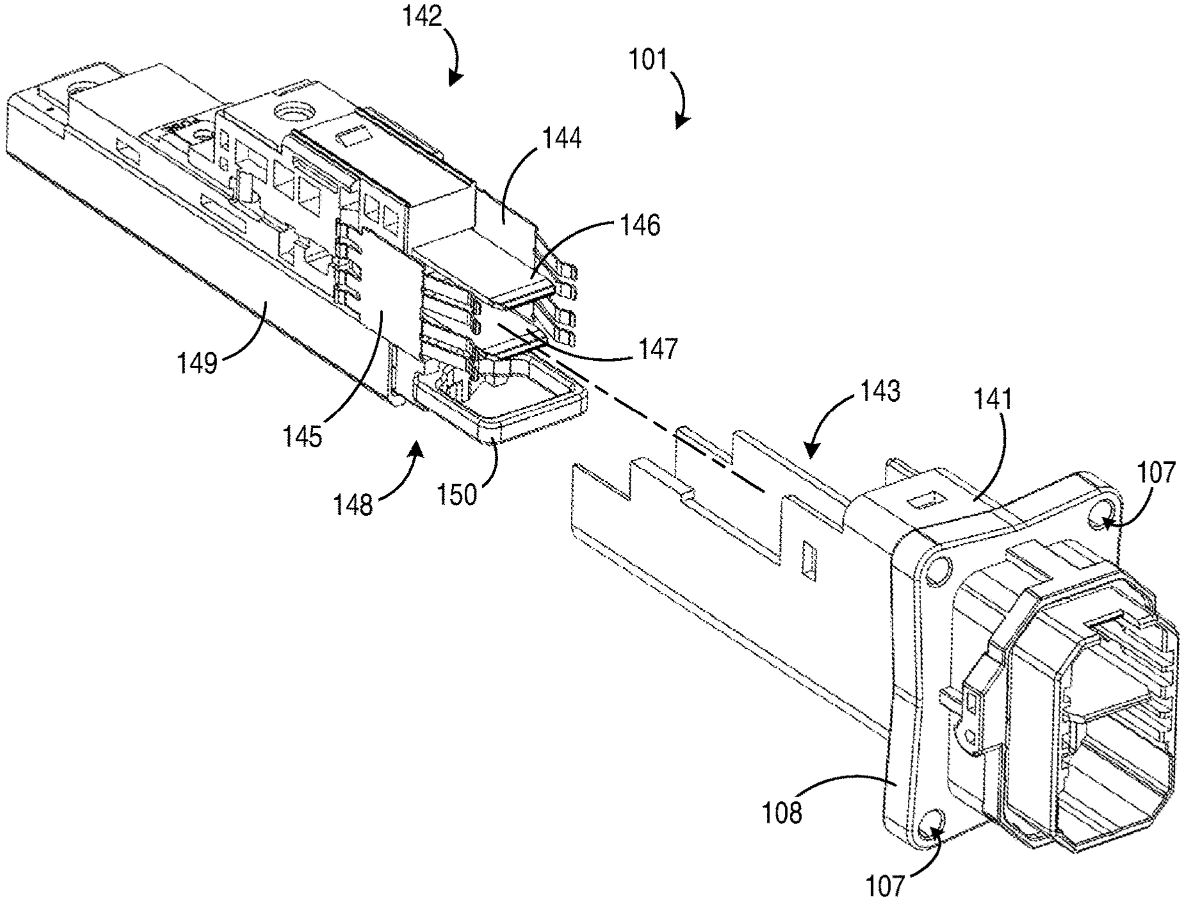
FIG. 7 is a partial exploded view of the socket body of the fuse holder of FIG. 1 according to an embodiment.

FIG. 7 is a partial exploded view of the socket body 101 of the fuse holder 100 of FIG. 1 according to an embodiment. A socket body housing 141 is illustrated exploded from a socket assembly 142 insertable into an interior volume 143 of the socket body housing 141. A pair of chassis contacts 144, 145 are also illustrated as exploded from the socket body housing 141 and are discussed in FIGS. 14-16 below. The socket assembly 142 includes an upper bus bar 146 and a lower bus bar 147 extending from a proximal end 148 of a socket assembly housing 149. A multi-size fuse holder 150 also extends from the proximal end.

Figure 8:
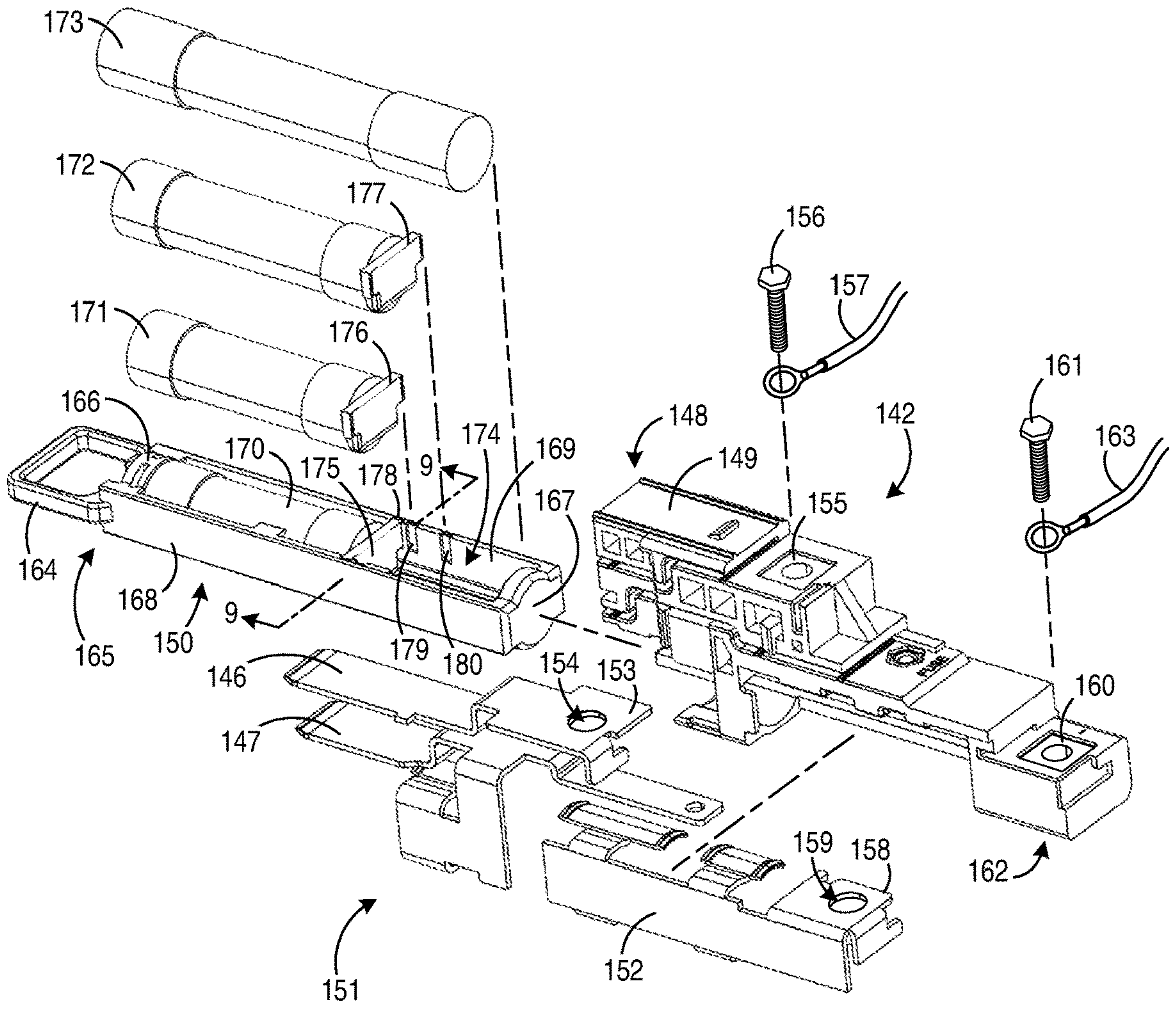
FIG. 8 is a partial exploded view of the socket assembly of FIG. 7 according to an embodiment.

FIG. 8 illustrates a partial exploded view of the socket assembly 142 of FIG. 7 according to an embodiment. A socket wire contact assembly 151 including the upper bus bar 146 and the lower bus bar 147 is exploded from a side of the socket assembly housing 149. The socket wire contact assembly 151 additionally includes a fuse bus bar 152 electrically coupleable to distal ends of fuses as explained below. When positioned within the socket assembly housing 149, a distal end 153 of the upper bus bar 146 is exposed outside the socket assembly housing 149 and includes a fastener aperture 154 configured to align with a fastener part or member 155 such as a nut and a corresponding fastener 156 such as a bolt for securing a corresponding wire 157 to the upper bus bar 146. Similarly, a distal end 158 of the fuse bus bar 152 is exposed outside the socket assembly housing 149 and includes a fastener aperture 159 configured to align with a fastener part 160 and a corresponding fastener 161 at a distal end 162 of the socket assembly housing 149 for securing a corresponding wire 163 to the fuse bus bar 152.

The fuse holder 150 is exploded from the proximal end 148 of the socket assembly housing 149. The fuse holder 150 includes a handle 164 at a proximal end 165, a pair of end walls 166, 167, and a pair of side walls 168, 169. A length of the fuse holder 150 between the end walls 166, 167 is sufficient to allow a plurality of fuses 170-173 of different sizes to sit within an interior volume 174 defined within the walls 166-169. The fuse holder 150 thus accommodates multiple fuse sizes and fuse values. As shown, a diameter of the fuses 170-173 is substantially similar; however, the length of each fuse 170-173 is different. To accommodate fuse sizes less than the length of the interior volume 174, end stops 175-177 may be provided to be inserted into corresponding end stop grooves 178-180. The end stops 175-177 operate to maintain the proximal ends of the fuses 170-172 near the proximal end of the fuse holder 150. The fuse 173, however, fits within the interior volume 174 without the need for a separate end stop. Instead, the end wall 167 functions as its end stop.

Figure 9:
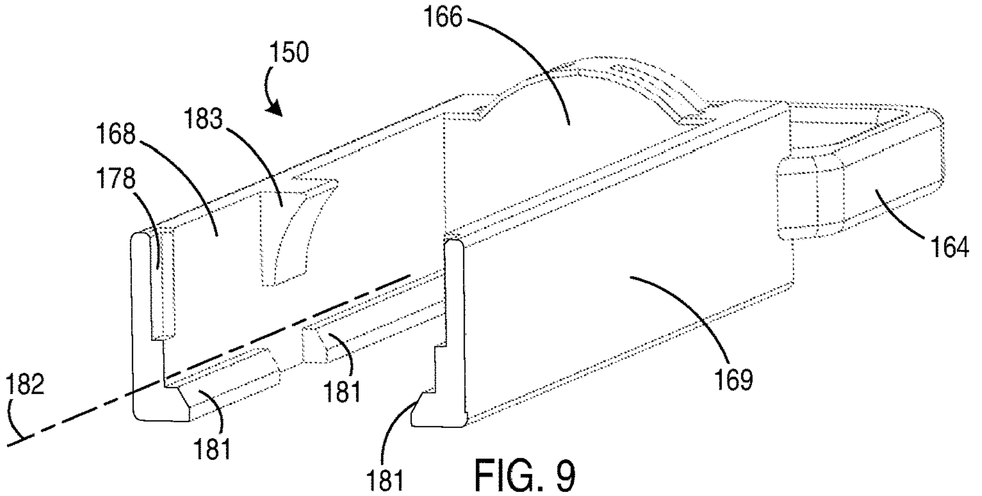
FIG. 9 illustrates a cross-sectional view of the fuse holder taken along line 9-9 of FIG. 8.

FIG. 9 illustrates a cross-sectional view of the fuse holder 150 taken along line 9-9 of FIG. 8. An extension of the side walls 168, 169 into the interior volume 174 at the bottom ends of the side walls 168, 169 forms an insertion stop 181 to allow the fuse to sit within the interior volume 174 without passing completely through the interior volume 174. Thus, the insertion stop 181 positions the inserted fuse along a central longitudinal axis 182 of the interior volume 174. Once inserted, the fuse is further held within the interior volume 174 via a side protrusion 183 extending from one or both side walls 168, 169. During insertion of the fuse, the side wall with the side protrusion 183 (e.g., side wall 168) may deflect or flex to allow the fuse to pass by the side protrusion 183. After insertion, the side wall and protrusion return to their non-flexed position to provide resistance against removal of the fuse from the interior volume 174.

Figure 10:
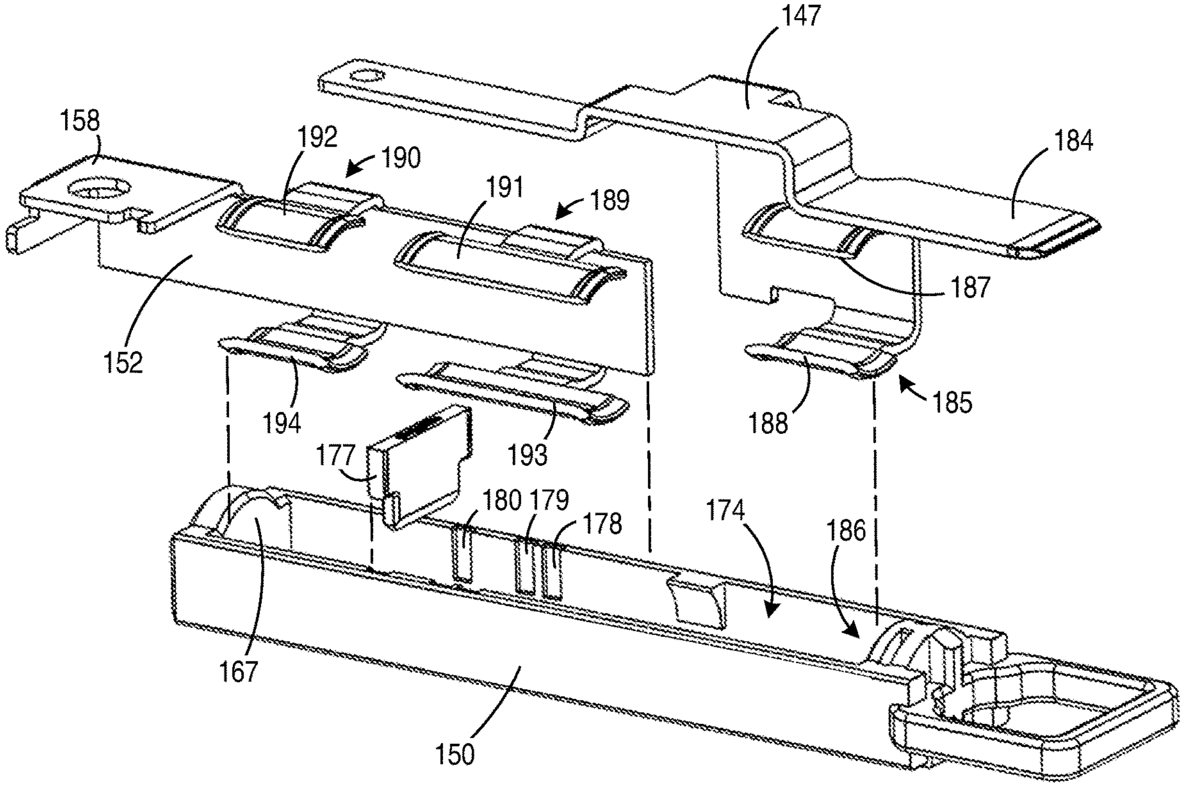
FIG. 10 is a partial exploded view of the fuse holder, lower bus bar, and fuse bus bar according to an embodiment.

FIG. 10 is an exploded view of the fuse holder 150, lower bus bar 147, and fuse bus bar 152 according to an embodiment. The lower bus bar 147 includes a contact blade 184 configured to engage the plug body 102 as described below. Electrically coupled with the contact blade 184 is a proximal end fuse contact assembly 185 aligned with a proximal end 186 of the interior volume 174 of the fuse holder 150. The proximal end fuse contact assembly 185 includes an upper contact 187 and a lower contact 188 configured to electrically engage a proximal end of one of the fuses 170-173 positioned therein. The lower bus bar 147 thus electrically couples the contact blade 184 with the proximal end of the fuse positioned within the interior volume 174.

The fuse bus bar 152 includes one or more distal end fuse contact assemblies 189, 190 configured to electrically couple with a distal end of the fuse positioned within the interior volume 174. The distal end fuse contact assemblies 189, 190 may also include respective upper and lower contacts upper bus bar 191, 192, 193, 194 to provide more contact surfaces for electrically coupling the fuse bus bar 152 with the installed fuse. As illustrated, the length of the distal end fuse contact assembly 189 is sufficient to electrically engage with any fuse with a length ending adjacently to any of the end stop grooves 178-180. The distal end fuse contact assembly 190 is positioned adjacently to the end wall 167 to engage with the distal end of the longest fuse 173. In another embodiment, distal end fuse contact assemblies 189, 190 may be formed by a single fuse contact with upper and lower contacts. With an unbroken fuse (e.g., any of fuses 170-173) installed in the fuse holder 150 and the fuse holder 150 positioned between the upper and lower contacts of the proximal and distal end fuse contact assemblies 185, 189, 190, electrical connectivity or conduction extends from the contact blade 184 to the distal end 158 of the fuse bus bar 152. However, in response to a broken fuse, electrical connectivity or conduction of the contact blade 184 with any part of the fuse bus bar 152 correspondingly breaks. As used herein, an unbroken fuse has its contact ends electrically shorted together (e.g., such as by an internal electrical wire or strip) such that a short circuit condition exists, and a broken fuse includes an electrical break between its contact ends such that an open circuit condition exists.

Figure 11:
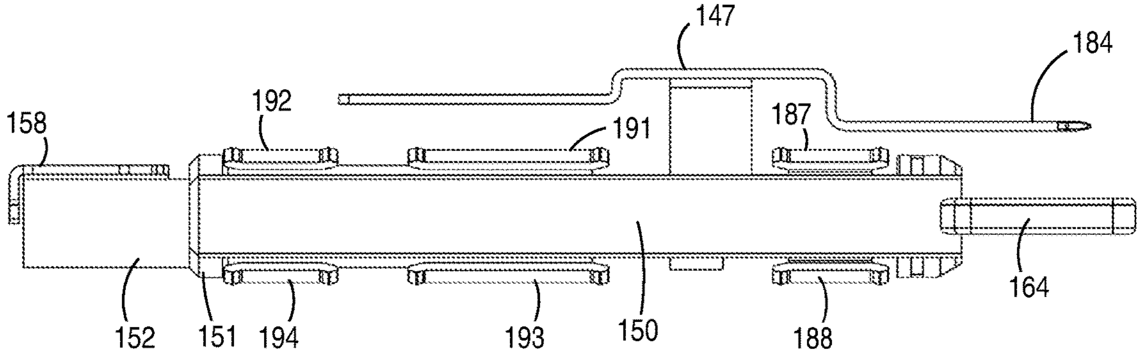
FIG. 11 is a side plan view of the non-exploded assembly of FIG. 11 according to an embodiment.
Figure 12:
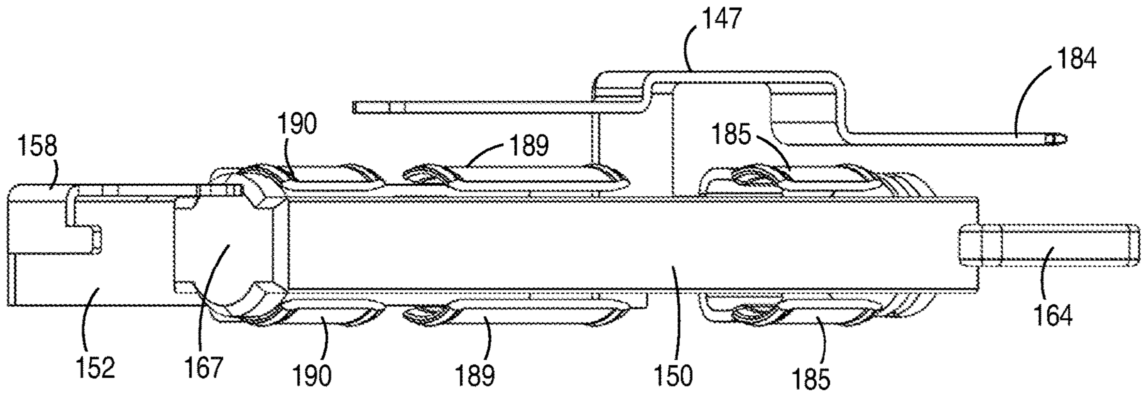
FIG. 12 is a rotated side plan view of the non-exploded assembly of FIG. 11 according to an embodiment.

FIG. 11 shows a side plan view of the non-exploded assembly of FIG. 11, and FIG. 12 shows a rotated side plan view of the non-exploded assembly of FIG. 11. The views of FIGS. 11 and 12 illustrate the relative positioning of the lower bus bar 147, the fuse bus bar 152, and the fuse holder 150 with respect to each other when fully inserted into the socket assembly housing 149. To simplify the drawings and focus on the lower bus bar 147, the fuse bus bar 152, and the fuse holder 150, the socket assembly housing 149 is not shown. As can be understood in these figures, removal of the fuse holder 150 from the socket assembly housing 149 (e.g., in a direction toward the right as illustrated in FIG. 11) permits the end wall 167 of the fuse holder 150 to pass between the upper and lower contacts of the proximal and distal end fuse contact assemblies 185, 189, 190. Likewise, a fuse installed within the fuse holder 150 also passes between the upper and lower contacts of the proximal and distal end fuse contact assemblies 185, 189, 190. Spring tension of the upper and lower contacts allows mechanical contact with the fuse when the fuse holder 150 is in its fully installed position. For example, the proximal end fuse contact 185 mechanically couples with a first end of any of the fuses 170-173 when inserted into the fuse holder 150. Depending on the length of the installed fuse 170-173, either of the distal end fuse contacts 189, 190 mechanically engages the second end of the fuse. As illustrated herein, for example, the distal end fuse contact 189 is configured to mechanically couple with the second end of the fuses 170-172 while the distal end fuse contact 190 is configured to mechanically couple only with the fuse 173. Other configurations for mechanically coupling with the second ends of the fuses 170-173, however, are contemplated herein.

Referring to FIGS. 2 and 7-12, when the plug body 102 is disconnected and separated from the socket body 101 in the unplugged arrangement (FIG. 2), the front or proximal end of the socket body 101 is exposed. The fuse holder 150 is thus able to be removed from the socket assembly housing 149 by pulling the handle 164 forward and out of the socket body 101. Such removal is capable only in the unplugged arrangement and is beneficial to replace a broken fuse, for example, with a replacement. Alternatively or in addition thereto, a different-sized fuse may be installed in the fuse holder 150 as a substitute. A change in fuse size may correspond with a repositioning, removal, or addition of a corresponding end stop (e.g., 175, 176, 177). Following replacement or substitution of a fuse within the fuse holder 150, the fuse holder 150 may be re-inserted into the socket assembly housing 149. As the fuse holder 150 is removed from or inserted into the socket assembly housing 149, the proximal end fuse contact assembly 185, the distal end fuse contact assembly 189, and the distal end fuse contact assembly 190 if the installed fuse is of a sufficient length flex via spring tension to allow the ends of the installed fuse to pass therethrough as described above.

Figure 13:
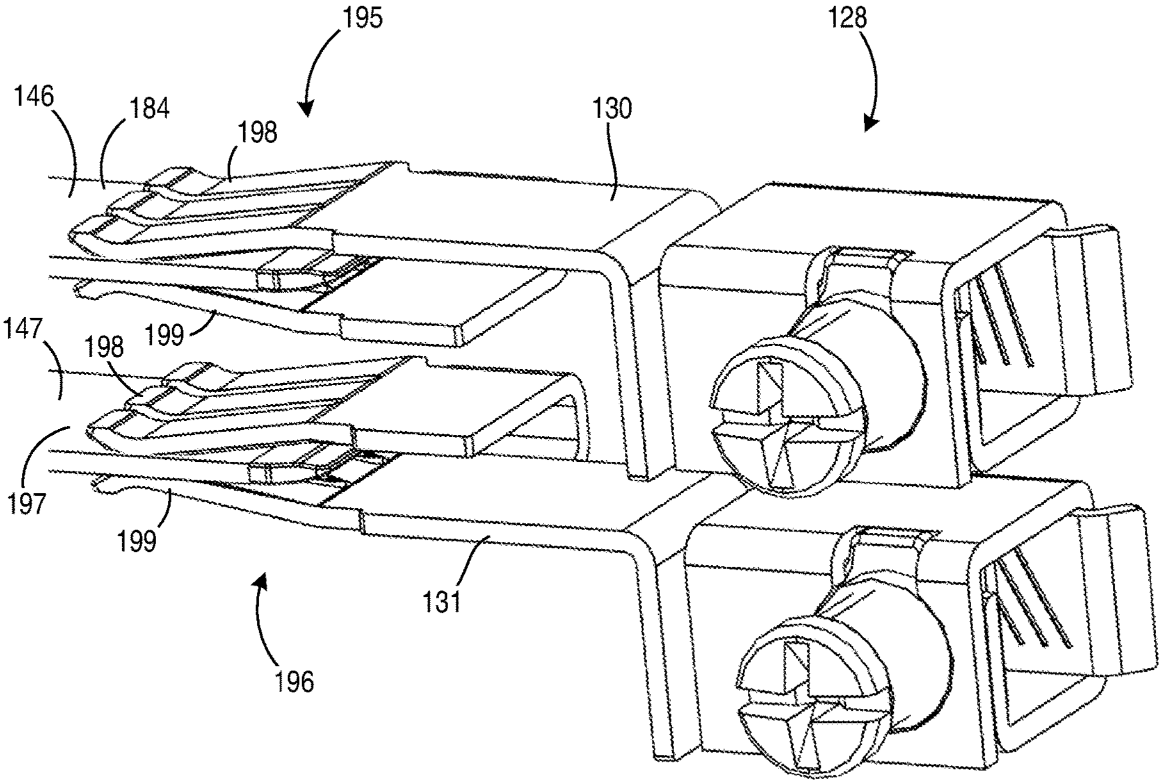
FIG. 13 illustrates engagement of the pair of the conductive wire contacts of FIG. 6 with mating contacts of the socket assembly of FIG. 7 according to an embodiment.

FIG. 13 illustrates mechanical and electrical engagement of the pair of the conductive wire contacts 130, 131 of the plug wire contact assembly 128 of FIG. 6 with the upper and lower bus bars 146, 147 of the socket assembly of FIG. 7 according to an embodiment. The conductive wire contacts 130, 131 include respective mating contacts 195, 196 for mechanically and electrically engaging and coupling the contact blade 184 of the upper bus bar 146 and a contact blade 197 of the lower bus bar 147. Upper and lower sets of flexible contacts 198, 199 of each mating contact 195, 196 allow a respective contact blade 184, 197 to pass therethrough via spring tension. In one embodiment as shown, the flexible contacts 198, 199 are each split into three contact fingers. However, other embodiments of more or fewer fingers are also contemplated herein. When inserted in the mating contacts 195, 196, the upper and lower bus bars 146, 147 electrically couple the socket body 101 with the plug body 102. Thus, a wire (e.g., wire strand 138) electrically coupled with the conductive wire contact 131 is also electrically coupled with the distal end 158 of the fuse bus bar 152 in response to an unbroken fuse being inserted in the fuse holder 150.

Figure 14:
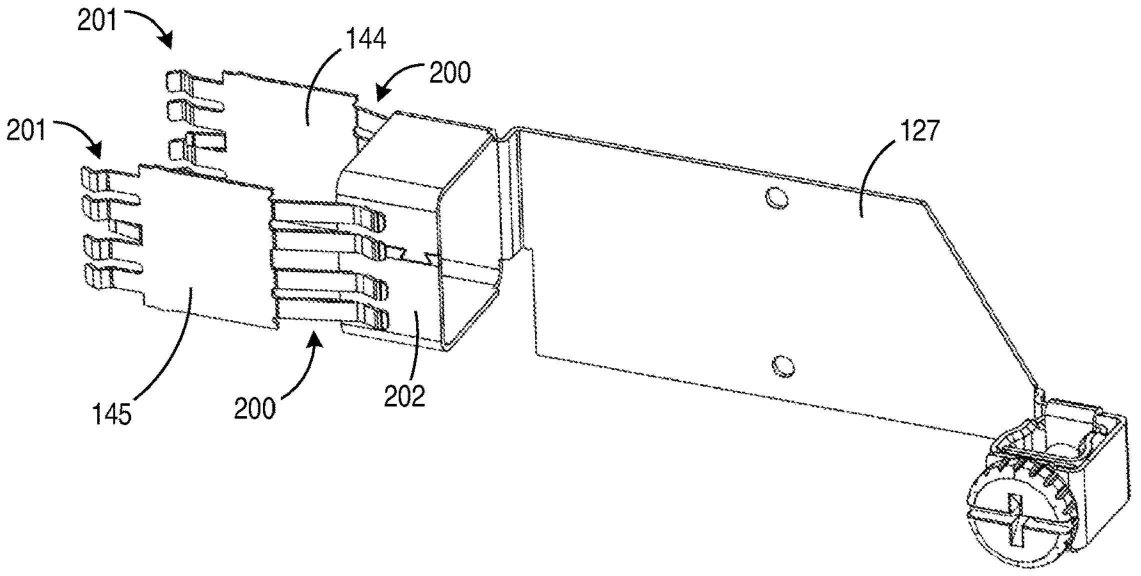
FIG. 14 illustrates engagement of the chassis wire contact with the chassis contacts according to an embodiment.

FIG. 14 illustrates engagement of the chassis wire contact 127 with the chassis contacts 144, 145 according to an embodiment. Similar to the mating contacts 195, 196, each of the chassis contacts 144, 145 includes a first set of spring-tensioned contacts 200 on a first side and a second set of spring-tensioned contacts 201 on a second side. As illustrated in FIG. 14, the first set of spring-tensioned contacts 200 of each of the chassis contacts 144, 145 electrically contacts and couples with a contact end member 202 of the chassis wire contact 127. The electrical engagement of the chassis contacts 144, 145 with the contact end member 202 occurs as a result of engaging the plug body 102 with the socket body 101.

Figure 15:
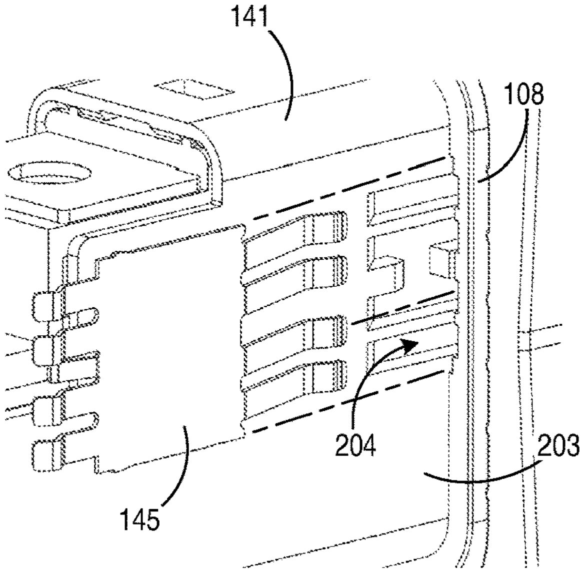
FIG. 15 is an exploded view of a chassis contact from the socket body housing according to an embodiment.
Figure 16:
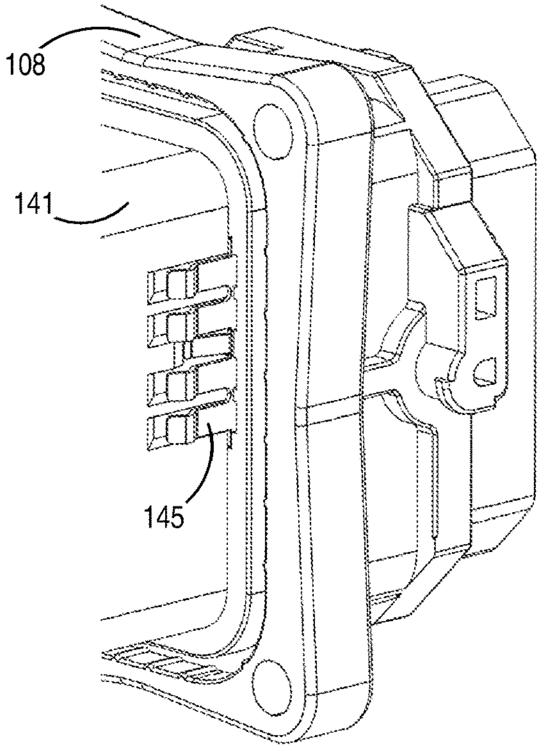
FIG. 16 shows the chassis contact installed within the socket body housing according to an embodiment.

FIG. 15 is an exploded view of the chassis contact 145 from the socket body housing 141 according to an embodiment. Between a side portion of the flange portion 108 and a side wall 203 of the socket body housing 141 is a chassis contact recess 204 into which the chassis contact 145 may be installed (see FIG. 16). The chassis contact recess 204 extends from the outer surface of the side wall 203 to an inner surface of the side wall 203 such that the installed chassis contact 145 extends from outside the side wall 203 and into the interior volume of the socket body 101 for electrical connection with the contact end member 202 of the chassis wire contact 127 as illustrated in FIG. 14. When installed in a chassis wall such as wall 104 illustrated in FIG. 1, the chassis contacts 144, 145 mechanically couple with the chassis wall. If the wall is electrically conductive, the chassis contacts 144, 145 further electrically couple with the chassis wall.

Embodiments of the fuse holder described herein allow for the fuse holder to hold fuses of different sizes for accommodating electrical performance requirements of the system into which the fuse holder is incorporated such that current protection via the installed fuse may be matched with the circuit. In this manner, the same fuse holder, if incorporated in one power delivery circuit (e.g., power converter), may provide current protection for a first current, and if incorporated into a different power delivery circuit, may provide current protection for a second current greater than the first current. The greater current protection required for the second current is easily handled by installing a larger sized fuse with a greater trip value. Further, the same power delivery circuit may provide power for a first load based on having a first fuse value and may provide power for an alternate second load based on having a second fuse value. Thus, the installed fuse may be changed on site with a different fuse with higher or lower current protection.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A socket assembly for a fuse connector comprising:
- a first bus bar comprising:
  - a contact blade extending toward a proximal end of the socket assembly; and
  - a fuse contact assembly;
- a fuse bus bar comprising:
  - a first fuse contact assembly; and
  - a distal end positioned adjacently to a distal end of the socket assembly; and
- a fuse holder removably engaged with the socket assembly and comprising an end wall at a distal end of the fuse holder;
- wherein the end wall is configured to pass through the fuse contact assembly of the first bus bar and through the first fuse contact assembly of the fuse bus bar when removed from or inserted into the socket assembly.

2. The socket assembly of claim 1, wherein the fuse contact assembly of the first bus bar comprises an upper bus bar and a lower bus bar;
- wherein the first fuse contact assembly of the fuse bus bar comprises an upper bus bar and a lower bus bar; and
- wherein the fuse holder is configured to pass between the upper bus bar and the lower bus bar of the fuse contact assembly of the first bus bar and between the upper bus bar and the lower bus bar of the first fuse contact assembly of the fuse bus bar when removed from or inserted into the socket assembly.

3. The socket assembly of claim 2, wherein the fuse bus bar further comprises a second fuse contact assembly comprising an upper bus bar and a lower bus bar; and
- wherein the fuse holder is further configured to pass between the upper bus bar and the lower bus bar of the second fuse contact assembly of the fuse bus bar when removed from or inserted into the socket assembly.

4. The socket assembly of claim 3, wherein the fuse contact assembly of the first bus bar is configured to mechanically and electrically couple with a first end of any fuse positioned within the fuse holder; and
- wherein the first fuse contact assembly of the fuse bus bar is configured to mechanically and electrically couple with a second end of a first fuse having a first length positioned within the fuse holder.

5. The socket assembly of claim 4, wherein the first fuse contact assembly of the fuse bus bar is further configured to mechanically and electrically couple with a second end of a second fuse having a second length different from the first length positioned within the fuse holder.

6. The socket assembly of claim 5, wherein the second fuse contact assembly of the fuse bus bar is configured to mechanically and electrically couple with a second end of a third fuse having a third length different from the first and second lengths positioned within the fuse holder.

7. The socket assembly of claim 1, wherein the socket assembly further comprises:
- a socket assembly housing; and
- a second bus bar comprising:
  - a contact blade extending toward the proximal end of the socket body; and a distal end is exposed outside the socket assembly housing.

8. The socket assembly of claim 7, wherein each of the distal ends of the first and second bus bars include an aperture therein configured to allow a respective fastener to pass therethrough for securing a respective wire thereto.

9. A fuse connector assembly comprising:

a socket body having an interior volume and comprising a socket assembly positioned within the interior volume of the socket body, the socket assembly comprising:

a first bus bar comprising:

a contact blade extending toward a proximal end of the socket body; and a fuse contact assembly;

a second bus bar comprising a contact blade extending toward the proximal end of the socket body;

a fuse bus bar comprising a first fuse contact assembly; and a fuse holder removable from the socket body and comprising an end wall configured to pass through the fuse contact assembly and the first fuse contact assembly during removal from and insertion into the socket body; and a plug body having an interior volume and comprising:

a wire body positioned within the interior volume of the plug body, the wire body comprising:

a first conductive wire contact configured to mechanically and electrically couple with the first bus bar; and a second conductive wire contact configured to mechanically and electrically couple with the second bus bar.

10. The fuse connector assembly of claim 9, wherein the plug body is configured to mechanically and electrically couple with the socket body in a plugged arrangement; and wherein the plug body is configured to be mechanically and electrically decoupled with the socket body in an unplugged arrangement.

11. The fuse connector assembly of claim 10, wherein the second conductive wire contact is electrically coupled with the fuse bus bar in the plugged arrangement and in response to an unbroken fuse positioned within the fuse holder and electrically coupling the fuse bus bar with the second bus bar; and wherein the second conductive wire contact is electrically decoupled from the fuse bus bar in the plugged arrangement and in response to a broken fuse positioned within the fuse holder.

12. The fuse connector assembly of claim 10, wherein:

the plug body further comprises:

a plug housing forming the interior volume of the plug body; and a latch assembly coupled to the plug housing and comprising:

a handle;

a pivot portion; and one or more locking arms;

the socket body further comprises a socket body housing comprising one or more locking tabs configured to mechanically couple with the one or more locking arms in response to the plugged arrangement and in response to the latch assembly being in a locking position.

13. The fuse connector assembly of claim 12, wherein, only in response to the latch assembly being in an unlocked position, the plug body and the socket body are capable of being separated from each other from the plugged arrangement into the unplugged arrangement.

14. The fuse connector assembly of claim 10, wherein the fuse holder is capable of being removed from and inserted into the socket body only in response to the unplugged arrangement.

15. The fuse connector assembly of claim 9, wherein the fuse contact assembly of the first bus bar comprises a pair of bus bars;

wherein the first fuse contact assembly of the fuse bus bar comprises a pair of bus bars; and wherein the fuse holder is configured to pass between the pair of bus bars of the fuse contact assembly of the first bus bar and between the pair of bus bars of the first fuse contact assembly of the fuse bus bar during removal from and insertion into the socket body.

16. The fuse connector assembly of claim 15, wherein the fuse bus bar further comprises a second fuse contact assembly comprising a pair of bus bars; and wherein the fuse holder is further configured to pass between the pair of bus bars of the second fuse contact assembly of the fuse bus bar during removal from and insertion into the socket body.

17. The fuse connector assembly of claim 16, wherein the fuse contact assembly of the first bus bar is configured to mechanically and electrically couple with a first end of any fuse positioned within the fuse holder; and wherein the first fuse contact assembly of the fuse bus bar is configured to mechanically and electrically couple with a second end of a first fuse having a first length positioned within the fuse holder.

18. The fuse connector assembly of claim 17, wherein the end wall of the fuse holder comprises a first end wall;

wherein the fuse holder further comprises:

a second end wall;

a pair of side walls coupled between the first and second end walls;

an insertion stop extending from a bottom end of the first and second end walls; and a side protrusion extending from one side wall of the pair of side walls;

wherein the first and second end walls and the pair of side walls define an interior volume of the fuse holder; and wherein the insertion stop and the side protrusion maintain a position of the first fuse within the interior volume.

19. The fuse connector assembly of claim 17, wherein the first fuse contact assembly of the fuse bus bar is further configured to mechanically and electrically couple with a second end of a second fuse having a second length different from the first length positioned within the fuse holder.

20. The fuse connector assembly of claim 19, wherein the second fuse contact assembly of the fuse bus bar is configured to mechanically and electrically couple with a second end of a third fuse having a third length different from the first and second lengths positioned within the fuse holder.

* * * * *